ically halogenated halosalicylanilide germicides with the addition of a minor proportion of halosalicylanilide germicides containing trifluoromethyl groups.

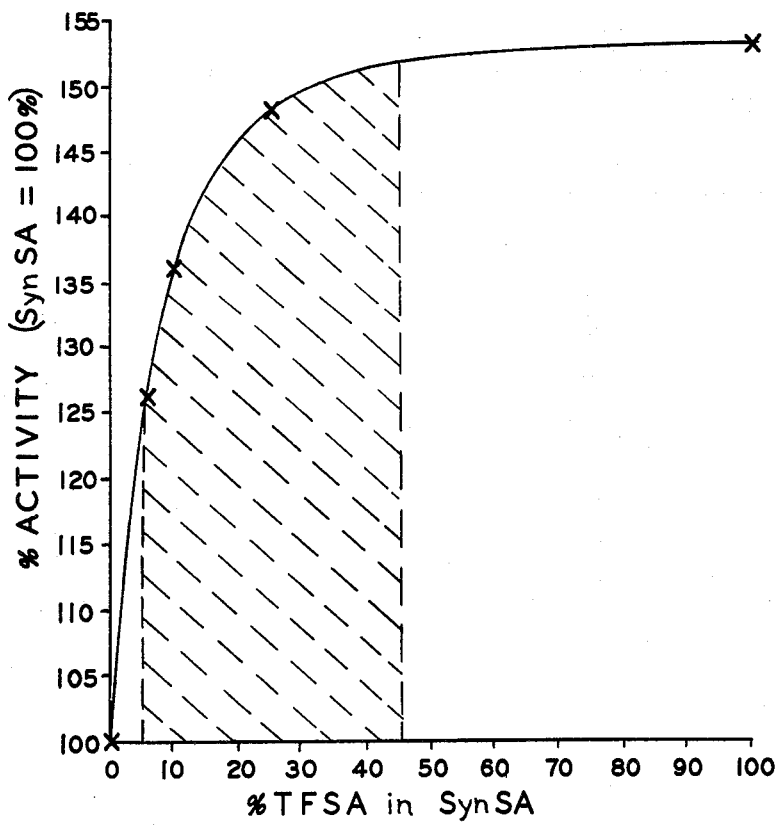

United States Patent Office 3,244,585
Patented Apr. 5, 1966

3,244,585
STABILIZED HALOSALICYLANILIDE
GERMICIDES
Herbert C. Stecker, 1 Bridle Way, Ho-Ho-Kus, N.J.
Filed Jan. 29, 1964, Ser. No. 341,029
9 Claims. (Cl. 167—31)

This invention relates to stabilized halosalicylanilide germicidal compositions. More specifically it relates to the stabilization of directly halogenated halosalicylanilide germicides with the addition of a minor proportion of halosalicylanilide germicides containing trifluoromethyl groups.

Directly halogenated halosalicylanilids, i.e., salicylanilides having halogen atoms directly attached to the aromatic nuclei, are potent germicides, and they are in commercial use at the present time. Recent tests on this type of germicides have shown that they have the property of losing effectiveness as the incubation period progresses. For example, if 3,5,4'-tribromosalicylanilide is incorporated in germicidal amount in broth containing E. coli, for example, its inhibitory index after 6 days of incubation can drop to only about 70% of the original effectiveness. The same is true in the case of trifluoromethyl-substituted salicylanilides, such as 3,5-dibromo-3'-trifluoromethyl salicylanilide. Apparently both of these types of compounds undergo some type of decomposition during the incubation period, resulting in a significant loss of activity. Efforts have been made to improve the stability of these germicidal compounds, without significant success.

It has now been found that the addition of trifluoromethyl-substituted halosalicylanilides, in minor amounts, to directly halogenated salicylanilides, effects a definite stabilization of the latter thereby enabling these latter compounds to retain more of their activity for extended periods of incubation time.

The directly halogenated salicylanilides involved in the present invention are the 3,5,4'-trihalosalicylanilides, alone, or in synergistic admixture with 5,4'-dihalosalicylanilides, such as the mixture described in U.S. Patent 2,906,711. The trihalosalicylanilides fall with the generic formula:

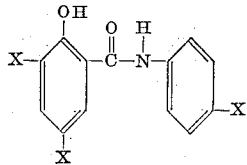

wherein X is a halogen of the class consisting of chlorine, bromine and iodine. The dihalosalicylanilides, which may be in synergistic admixture with the foregoing trihalo-compounds, fall within the generic formula:

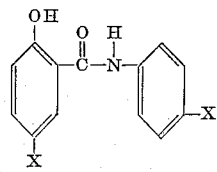

wherein X is a halogen selected from the class consisting of chlorine, bromine and iodine.

Examples of the trihalosalicylanilides include 3,5,4'-tribromosalicylanilide, 3,5,4'-triiodosalicylanilide, 3,5,4'-trichlorosalicylanilide, 3,5 - dibromo-4'-chlorosalicylanilide, and the like. Examples of the dihalosalicylanilides useable in synergistic admixture, include 5,4'-dichlorosalicylanilide, 5 - chloro - 4' - bromo-salicylanilide, 5 - bromo-4'-chlorosalicylanilide, 5-iodo-4'-bromosalicylanilide, and the like.

The stabilizer compounds to be added, in minor amounts, to the foregoing, fall within the general formula:

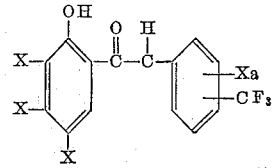

wherein X is a halogen atom selected from the class consisting of chlorine, bromine and iodine, or hydrogen, and $a$ is a number ranging from 0 to 2. These compounds contain one to three directly-attached halogen atoms (i.e., directly attached to an aromatic nucleus), none of which being positioned adjacent the $CF_3$ group and, when containing one or more halogen atoms, none of the halogen atoms being positioned adjacent to each other. Examples of such stabilizing compounds include 3,5-dibromo-3'-trifluoromethyl salicylanilide, 5-chloro-3'-trifluoromethyl salicylanilide, 5-iodo-3'-trifluoromethyl salicylanilide, 3,5-dichloro-3'-trifluoromethyl salicylanilide, 5-chloro-3'-trifluoromethyl chlorosalicylanilide and the like. Such compounds are described in U.S. Patent 3,041,236. These latter stabilizing compounds are added in about 5% to about 45% by weight (of the total germicidal mixture) to the directly-attached halogenated salicylanilides which are free of trifluoromethyl groups.

The invention will be more readily understood by reference to the following examples in which a preferred embodiment is described:

EXAMPLE 1

One hundred milligrams of synergistic mixture of (1) 80% by weight of 3,5,4'-tribromosalicylanilide and 20% of 5,4'-dibromosalicylanilide (hereinafter referred to as Syn. SA), and (2) 3,5-dibromo-3'-trifluoromethyl salicylanilide, hereinafter referred to as TFSA, were dissolved in 10 ml. amounts of acetone. Each acetone solution was mixed with enough brain heart infusion (B.H.I.) broth to make two separate 1000 ml. portions. Each broth represented a 1:10,000 dilution. Each appeared as clear solutions. Two drops of Dow Corning "Antifoam B" were added to prevent subsequent frothing on shaking. From each mixture, dilutions were prepared in 10 ml. quantities in sterile culture tubes ranging in concentration up to 1:250,000. Fourteen such dilutions were made.

Three combinations of Syn. SA and TFSA were prepared by mixing the 1:10,000 dilutions in the following proportions:

(A) 95 ml. Syn. SA _____ 1:10,000
    5 ml. TFSA _____ 1:10,000
(B) 90 ml. Syn. SA _____ 1:10,000
    10 ml. TFSA _____ 1:10,000
(C) 75 ml. Syn. SA _____ 1:10,000
    25 ml. TFSA _____ 1:10,000

Fourteen dilutions of each of these combinations were made similar to concentration to those of Syn. SA and TFSA. One-tenth ml. of a 24 hr. old broth culture of E. coli was added to all tubes as well as to a control broth of B.H.I. The densities of all broths were recorded prior to incubation and at intervals of 2 days, 3 days, and 6 days of incubation at 37° C. The inhibitor index (I.I.) was computed for each of the five series of dilutions for each time period and comparisons were made. The pertinent data for these tests are given in Table I.

It will be noted that a sharp drop in densities occurs after five days of incubation. Since the broths contain many dead organisms, the differences in optical densities between living and dead organisms could explain this phenomenon. However, since the I.I. is a comparison of agent activity and organism growth control, this phenomenon should not affect the interpretation of the results. When the aforesaid results are recalculated on

TABLE I.—DENSITOMETER RECORDINGS

|  | Syn. SA | | | TFSA | | | A. 95% Syn. SA, 5% TFSA | | | B. 90% Syn. SA, 10% TFSA | | | C. 75% Syn. SA, 25% TFSA | | |
|---|---|---|---|---|---|---|---|---|---|---|---|---|---|---|---|
| Days of incubation | 2 | 3 | 6 | 2 | 3 | 6 | 2 | 3 | 6 | 2 | 3 | 6 | 2 | 3 | 6 |
| Total increase for all readings | 359 | 351 | 558 | 397 | 407 | 589 | 334 | 353 | 558 | 343 | 342 | 531 | 328 | 338 | 473 |
| Average increase per broth (ADA) | 25.5 | 25.1 | 39.9 | 28.3 | 29.0 | 42.1 | 23.9 | 25.2 | 39.9 | 24.5 | 24.4 | 38.0 | 23.5 | 24.1 | 33.8 |
| Inhibitory index (I.I.) | 1.61 | 1.71 | 1.15 | 1.44 | 1.48 | 1.09 | 1.71 | 1.70 | 1.15 | 1.67 | 1.76 | 1.21 | 1.74 | 1.78 | 1.33 |

If the inhibitory indices of Syn. SA after 2, 3, and 6 days of incubation were regarded as 100%, then, for the purpose of determining stabilization activity, comparisons can be made with the three blends A, B and C, and such comparison is shown in Table II.

TABLE II.—PERCENT OF Syn. SA

| Day | Syn. SA. | TFSA | Comp. A., 95-5 | Comp. B., 90-10 | Comp. C., 75-25 |
|---|---|---|---|---|---|
| 2 | 100 | 89.4 | 106.2 | 103.7 | 108.1 |
| 3 | 100 | 86.5 | 99.4 | 102.8 | 104.0 |
| 6 | 100 | 94.7 | 100 | 104.2 | 114.7 |

Since the TFSA is a weaker germicide with respect to E. coli than Syn. SA, it is apparent from the last four columns that a synergism is present between the two, as otherwise the last 3 columns of the 2-days period would have shown a value lower than 100. However, the significant fact to be noted is that the TFSA is a potent stabilizer for Syn. SA, as can be seen from the figures for the 6-day period, where, in spite of the fact that both germicides have lost inhibitory power, and even though TFSA is generally weaker than Syn. SA, the 25% blend (C) showed a potency of about 115% greater than Syn. SA alone. It thus appears that TFSA, in some manner, delays or interferes with the inactivation of Syn. SA.

EXAMPLE 2

The procedure in this example was similar to that in Example 1, with the exception that 20 dilutions for each agent were set up ranging in concentration between 1:833,000 and 1:8,000,000. Densitometer readings were made after 1, 2, 5, 7 and 9 days of incubation. Five control organism cultures of Staph. aureus were inoculated and the average of their densitometer readings was used in computing the inhibition index. The readings of the control broths are given in Table III.

TABLE III

| Broth No. | 1 | 2 | 3 | 4 | 5 | Average |
|---|---|---|---|---|---|---|
| Day |  |  |  |  |  |  |
| 1 | 96 | 88 | 90 | 95 | 90 | 92 |
| 2 | 95 | 91 | 93 | 94 | 93 | 93 |
| 5 | 65 | 72 | 70 | 74 | (*) | 70 |
| 7 | 60 | 57 | 64 | 68 | (*) | 62 |
| 9 | 59 | 56 | 60 | 67 | (*) | 60 |

*Disregarded due to contamination with unknown organism.

the basis of Syn. SA as 100%, as in Table II, the results are as given in Table IV.

TABLE IV

| Day | Ave. Density | I.I. | Percent of Syn. SA |
|---|---|---|---|
| Syn. SA | | | |
| 1 | 14.0 | 6.57 | 100 |
| 2 | 22.4 | 4.15 | 100 |
| 5 | 25.0 | 2.80 | 100 |
| 7 | 26.4 | 2.38 | 100 |
| 9 | 28.6 | 2.10 | 100 |
| TFSA | | | |
| 1 | 13.8 | 6.66 | 101.3 |
| 2 | 20.9 | 4.45 | 107.3 |
| 5 | 23.2 | 3.01 | 107.5 |
| 7 | 16.9 | 3.70 | 156.2 |
| 9 | 18.6 | 3.22 | 153.3 |
| Comp. A, 95-5 | | | |
| 1 | 13.9 | 6.62 | 100.7 |
| 2 | 20.6 | 4.51 | 108.6 |
| 5 | 25.7 | 2.72 | 96.5 |
| 7 | 19.9 | 3.12 | 131.1 |
| 9 | 22.6 | 2.15 | 126.3 |
| Comp. B, 90-10 | | | |
| 1 | 11.7 | 7.86 | 119.6 |
| 2 | 19.7 | 4.72 | 113.7 |
| 5 | 24.1 | 2.90 | 103.6 |
| 7 | 21.2 | 2.92 | 122.6 |
| 9 | 21.0 | 2.86 | 136.2 |
| Comp. C, 75-25 | | | |
| 1 | 14.4 | 6.40 | 97.4 |
| 2 | 21.9 | 4.25 | 102.4 |
| 5 | 21.8 | 3.21 | 111.1 |
| 7 | 19.0 | 3.26 | 137.0 |
| 9 | 19.3 | 3.11 | 148.1 |

In the case of Staph. aureus, TFSA is more potent than Syn. SA, especially after 5 days of incubation. The stabilizing effect of TFSA on Syn. SA is very apparent in the higher concentrations of TFSA during the longer incubation periods. For example a 25% concentration of TFSA in Syn. SA after 9 days of incubation had a germicidal activity of about 150% that of Syn. SA alone, which is strong evidence that Syn. SA is not stable in an aqueous medium during prolonged incubation at 37° C., and that TFSA is a potent stabilizer under such conditions. Even in 5% concentration, TFSA increases potency of Syn. SA by over 26% in 9 day tests. Further tests indicate that such stabilization is effective even in 30% concentrations of TFSA in Syn. SA.

The 9th day data of Table IV have been plotted as a curve in the attached figure of the drawing. It will be noted that a smooth curve is obtained showing that TFSA, when added in minor quantities to Syn SA, improves greatly the 9-day stability. For example, a 5% addition of TFSA results in over a 125% effectiveness, when 0% TFSA (or pure Syn. SA) is taken as 100%. At 45% concentration of TFSA, the mixture has practically the same effectiveness as pure TFSA.

I claim:

1. A germicidal mixture of improved stability comprising about 55% to about 95% by weight of a compound having the general formula:

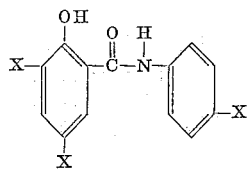

wherein X is a halogen atom of the class consisting of chlorine, bromine, and iodine, and about 5% to about 45% by weight of a stabilizer compound having the general formula:

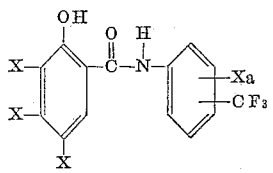

wherein X is a substituent selected from the class consisting of chlorine, bromine, iodine, and hydrogen, and $a$ is a number ranging from 0 to 2, there being at least one and not more than three directly-attached halogen atoms, none of which are adjacent to each other or to the $CF_3$ group, said individual germicidal compounds having undergone some type of decomposition during an incubation period of at least one to nine days in an aqueous medium, resulting in a significant loss of activity.

2. A germicidal mixture of improved stability comprising about 55% to about 95% by weight of a synergistic mixture containing, as one ingredient, a compound having the general formula:

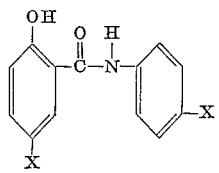

wherein X is a halogen atom of the class consisting of chlorine, bromine, and iodine, and, as the other ingredient, a compound having the general formula:

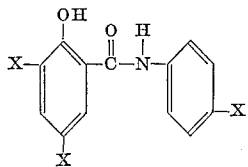

wherein X is a halogen atom selected from the class consisting of chlorine, bromine and iodine, and about 5% to about 45% of a stabilizer compound having the general formula:

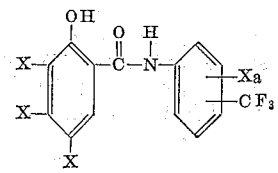

wherein X is a substituent selected from the class consisting of chlorine, bromine, iodine and hydrogen, and $a$ is a number ranging from 0 to 2, there being at least one and not more than three directly-attached halogen atoms, none of which are adjacent to each other or to the $CF_3$ group, said individual germicidal compounds having undergone some type of decomposition during an incubation period of at least one to nine days in an aqueous medium, resulting in a significant loss of activity.

3. A germicidal mixture of improved stability comprising about 55% to about 95% by weight of 3,5,4'-trihalosalicylanilide, and about 5% to about 45% of 3,5-dihalo-3'-trifluoromethyl salicyanilide stabilizer, said individual germicidal compounds having undergone some type of decomposition during an incubation period of at least one to nine days in an aqueous medium, resulting in a significant loss of activity.

4. A germicidal mixture of improved stability comprising about 55% to about 95% by weight of a synergistic mixture containing, as one ingredient, 3,5,4'-tribromosalicylanilide, and, as the other ingredient, 5,4'-dibromo-salicylanilide, and about 5% to 45% of 3,5-dibromo-3'-trifluoromethyl salicyanilide stabilizer, said individual germicidal compounds having undergone some type of decomposition during an incubation period of at least one to nine days in an aqueous medium, resulting in a significant loss of activity.

5. A germicidal mixture of improved stability comprising about 75% to about 95% by weight of a compound having the general formula:

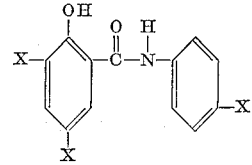

wherein X is a halogen of the class consisting of chlorine, bromine, and iodine, and about 5% to about 25% of a stabilizer compound having the general formula:

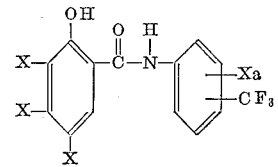

wherein X is a substituent selected from the class consisting of chlorine, bromine, iodine, and hydrogen, and $a$ is a number ranging from 0 to 2, there being at least one and not more than three directly-attached halogen atoms, none of which are adjacent to each other or to the $CF_3$ group, said individual germicidal compounds having undergone some type of decomposition during an incubation period of at least one to nine days in an aqueous medium, resulting in a significant loss of activity.

6. A germicidal mixture of improved stability comprising about 75% to about 95% by weight of 3,5,4'-trihalosalicylanilide, and about 5% to about 25% by weight of 3,5-dihalo-3'-trifluoromethyl salicyanilide stabilizer, said individual germicidal compounds having undergone some type of decomposition during an incubation period of at least one to nine days in an aqueous medium, resulting in a significant loss of activity.

7. A germicidal mixture of improved stability comprising about 75% to about 95% by weight of a synergistic mixture containing, as one ingredient, 3,5,4'-tribromosalicylanilide, and, as the other ingredient, 5,4'-dibromo salicylanilide, and about 5% to about 25% of 3,5-dibromo - 3' - trifluoromethyl salicylanilide stabilizer, said individual germicidal compounds having undergone some type of decomposition during an incubation period of at least one to nine days in an aqueous medium, resulting in a significant loss of activity.

8. A germicidal composition according to claim 7 in which the said synergistic mixture contains 65% to 98% by weight of 3,5,4'-tribromosalicylanilide and 2% to 35% of 5,4'-dibromosalicylanilide, said individual germicidal compounds having undergone some type of decomposition during an incubation period of at least one to nine days in an aqueous medium, resulting in a significant loss of activity.

9. A method of retaining synergistic germicidal activity against *S. aureus* and *E. coli* and other micro-organisms after at least one to nine days' incubation in an aqueous medium, which consists essentially of the step of introducing and maintaining present in an aqueous medium susceptible to contamination by such micro-organisms a germicidal mixture comprising a major proportion of a compound having the general formula:

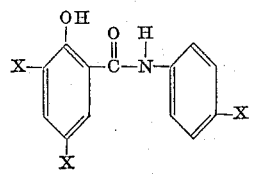

where X is a halogen of the class consisting of chlorine, bromine, and iodine, and a minor proportion of a stabilizer compound having the general formula:

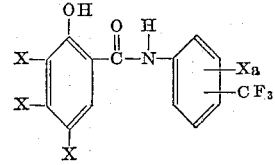

where X is a substituent selected from the class consisting of chlorine, bromine, iodine, and hydrogen, and $a$ is a number ranging from 0 to 2, there being at least one and not more than three directly-attached halogen atoms, none of which are adjacent to each other or to the $CF_3$ group, until synergistic activity is present in spite of the fact that both germicide compounds have lost germicidal power after one to nine days' incubation in such aqueous medium.

References Cited by the Examiner

UNITED STATES PATENTS 2,906,711  9/1959  Stecker _____ 252—106
3,041,236  6/1962  Stecker _____ 167—31
3,134,711  5/1964  Reller et al. _____ 167—30

OTHER REFERENCES

Reller et al.: Belg. 614,826, Mar. 30, 1962, 16 pp. spec.; abstracted in English in Chem. Abstracts 57: P12646F, Nov. 12, 1962.

Reller et al.: Ger. 1, 158,216, Nov. 28, 1963, 4 pp. spec.; abstracted in English in Chem. Abstracts 60: P11859F, May 11, 1964.

Soliman et al.: "Proposed Method of Assay for Diaphene," J. Pharm. Sci. 52: 43–6 (1963), per Chem. Abs. 58: 8847c, Apr. 29, 1963.

Stecker: "Antimicrobials in Soaps, Cosmetics," Soap Chem. Specialties 39(5): 75–7 (1963), per Chem. Abs. 59: 4175e, Aug. 19, 1963.

Stecker et al.: "A Brominated Salicylanilide Antiseptic Mixture for Soaps and Cosmetics," J. Soc. Cosmetic Chemists 11: 347–362 (1960), per Chem. Abstracts 54: 23198e, Nov. 19, 1960.

LEWIS GOTTS, *Primary Examiner.*

SHEP K. ROSE, *Assistant Examiner.*